United States Patent [19]

Newman

[11] Patent Number: 4,483,425

[45] Date of Patent: Nov. 20, 1984

[54] VIBRATION CONTROL SYSTEM

[75] Inventor: Wyatt S. Newman, New York, N.Y.

[73] Assignee: North American Philips Corporation, New York, N.Y.

[21] Appl. No.: 416,535

[22] Filed: Sep. 9, 1982

[51] Int. Cl.³ .............................................. F16F 15/04
[52] U.S. Cl. .................................. 188/378; 248/550; 248/559; 318/649
[58] Field of Search ..................... 188/1.11, 378, 379, 188/380, 382, 180; 248/550, 559, 562, 636; 318/114, 648, 649; 267/136, 137, 140.1; 244/17.13, 17.27; 74/574, 604

[56] References Cited

U.S. PATENT DOCUMENTS

| | | | |
|---|---|---|---|
| 3,566,993 | 3/1971 | Leatherwood et al. | 188/379 |
| 3,606,233 | 9/1971 | Scharton et al. | 248/550 |
| 3,952,979 | 4/1976 | Hansen | 188/382 |
| 4,083,433 | 4/1978 | Geohegan, Jr. et al. | 188/382 |

FOREIGN PATENT DOCUMENTS

| | | | |
|---|---|---|---|
| 581345 | 11/1977 | U.S.S.R. | 248/550 |
| 653146 | 3/1979 | U.S.S.R. | 188/378 |

OTHER PUBLICATIONS

Morison, J. et al., "Comparison of Optimized Active and Passive Vibration Absorbers," Joint Automatic Control Conference of the American Automatic Control Council 1973, pp. 932–938.

Ruzicka, J. E. "Fundamental Concepts of Vibration Control," *Sound and Vibration*, Jul. 1971, pp. 16–22.

Primary Examiner—Douglas C. Butler
Assistant Examiner—R. R. Diefendorf
Attorney, Agent, or Firm—Marc D. Schechter

[57] ABSTRACT

A vibration compensation system for actively attenuating the vibration of a machine. The machine has a housing, with respect to which vibration is to be damped, and at least one body moving within the housing. The vibration compensation system includes a countermass capable of being linearly reciprocated relative to the housing in a direction parallel to the motion of the moving body within the machine. A motor, coupled to the housing, drives the countermass. Elements are provided for sensing the position, or any time derivative or time integral thereof, relative to the housing of the moving body and the countermass. control elements supply power to the motor in response to the signal outputs from all of the sensors so that the acceleration of the countermass is in a direction opposite the acceleration of the moving body. The magnitude of the acceleration of the countermass is equal to the product of the acceleration of the moving body multiplied by its mass divided by the mass of the countermass.

9 Claims, 3 Drawing Figures

VIBRATION CONTROL SYSTEM

BACKGROUND OF THE INVENTION

The invention relates to vibration control systems for attenuating the vibration of a machine having moving parts.

In order to impart motion to one or more parts within a machine, it is necessary to apply a force to these parts. Basic physics explains that a force cannot be simply applied to a single body, but must be applied between two bodies. Hence, the application of a force to impart motion to a body within a machine simultaneously exerts an opposite force on the remainder of the machine. Consequently, the reactive forces on the machine cause the machine to vibrate.

In the past, many methods have been proposed for controlling and reducing the level of undesirable mechanical vibrations in machines. Some of these methods are described in an article entitled "Fundamental Concepts of Vibration Control" by Jerome E. Ruzicka (*Sound and Vibration*, July 1971, pages 16–22).

For example, passive vibration isolation and absorption uses a combination of springs and dampers to isolate the vibrating body from its environment and to absorb and dissipate vibrational energy. Problems with this approach, however, include the fact that this technique cannot be used to simultaneously reduce the amplitude of the displacement of the machine due to the vibrations and the vibrational forces transmitted through the machine mount. Moreover, a machine with passive vibration isolation and absorption does not behave as a constant mechanical impedance (i.e. it does not behave as a solid body with constant mass). This latter factor can be a concern in aircraft and spacecraft applications.

Another method of vibration control is mechanical balancing. A rhombic drive is an example of this approach, where each moving mass is counteracted by a balancing countermass which is mechanically driven in opposition to the moving mass. Problems with this approach include the fact that balancing is limited by the accuracy, symmetry, and linearity of each compensating component. Further, mechanical balancing imposes undesireable design constraints, such as requiring significantly larger machine volumes and more moving parts. Moreover, the performance of this approach may seriously degrade with time or external influences.

Another related method of vibration control is passive vibration compensation, which uses inertial compensation through a resonant spring-countermass combination. This method is reasonably effective if the inertial force imbalance to be compensated is primarily sinusoidal at a single constant frequency. The spring-mass combination can be tuned to this frequency so that it responds to vibrations by oscillating to help cancel the vibrations. However, the effectiveness of this approach is limited because compensation only occurs at the single selected frequency, the amount of compensation depends upon the characteristics of the mechanical connection between the machine and its environment, and performance may seriously degrade with time or external influences. Moreover, as in the case of mechanical balancing, each moving body must usually be provided with a spring-countermass combination. This again results in larger machine volumes and more moving parts.

The method of vibration control most recently proposed to date utilizes active vibration isolation and absorption. In this system, a sensor is attached to the machine subject to vibration. The sensor produces an output signal which is proportional to the acceleration of the machine. The sensor output signal is processed by a signal processor to produce a control signal for driving a reaction mass in such a manner as to reduce the total acceleration of the machine. (See, for example, U.S. Pat. No. 4,083,433, and "Comparison of Optimized Active and Passive Vibration Absorbers," by J. Morison et al., *Joint Automatic Control Conference of the American Automatic Control Council*, 1973, pages 932–938.)

These new active vibration control systems are not entirely problem-free. Since the feedback signal comes from the gross motion of the machine, the net compensation is affected by the characteristics of the machine mount. The mechanical mount therefore limits performance and can also affect the stability of the feedback loop. Moreover, this scheme attempts to keep the machine in a single inertial fram of reference. This causes the mechanical impedance of the machine to vary both with frequency and with time. The vibration control system thus acts to oppose and counteract *any* movement of the machine, whether vibrational or translational. These problems can be especially important where the machine/vibration control system is to be used in aircraft or spacecraft.

SUMMARY OF THE INVENTION

It is an object of the invention to provide a vibration compensation system for attenuating the vibration of a machine while causing little or no variation in the mechanical impedance of the entire machine.

It is another object of the invention to provide a vibration compensation system which experiences little or no degradation over time or as a result of external influences.

It is yet another object of the invention to provide a vibration compensation system which can utilize position sensors of relatively simple and inexpensive construction and whose outputs remain relatively stable.

It is still another object of the invention to provide a vibration compensation system which has a minimal impact on the basic design of the machine with which it is to be used.

According to the invention, a vibration compensation system is provided for actively attenuating the vibration of a machine having a housing and at least one body moving within the housing. The moving body has a velocity component parallel to a given linear dimension (for example, the linear dimension may be a straight axis or it may be a curved line).

The compensation system comprises a countermass capable of being linearly reciprocated relative to the housing in a direction parallel to the given linear dimension. A motor, coupled to the housing, is provided for driving the countermass. The system also includes sensing means for sensing the position, or any time derivative or time integral thereof, of the moving body along the linear dimension relative to the housing. Sensing means are also provided for sensing the position, or any time derivative or time integral thereof, of the countermass. Control means supply power to the motor in response to the signal outputs from the sensing means in a way that causes the acceleration of the countermass to be in a direction opposite the acceleration of the moving body. The magnitude of the acceleration of the countermass is controlled by the control means to be equal to the product of the acceration of the moving body multiplied by its mass divided by the mass of the countermass.

In a preferred form of the invention, the vibration compensation system is used with a machine having at least one body moving within the housing with a velocity component parallel to a straight axis. The sensors measure the axial positions, or time derivatives or time integrals thereof, of the moving body and the countermass.

In another embodiment of the invention, the machine has more than one moving body, and the compensation system comprises separate means for sensing the axial positions of each moving body. The control means supplies power to the motor such that the magnitude of the axial acceleration of the countermass is equal to the vector sum of the products of the axial acceleration of each moving body multiplied by its mass divided by the mass of the countermass.

Preferably, according to the invention, each means for sensing the axial position, or any time derivative or time integral thereof, is a position transducer which produces a signal output whose magnitude is a function of position. In other embodiments of the invention, the sensing means may be an acceleration transducer producing a signal output whose magnitude is a function of acceleration, or a velocity transducer producing a signal output whose magnitude is a function of velocity.

According to the invention, the control means preferably comprises one or more amplifiers for separately amplifying the signal output of each sensing means. The control means further includes an adder, for adding the amplified signal outputs and generating an error signal. Feedback amplifier means then amplify the error signal and produce a signal for powering the motor.

In order to minimize the power consumption of the vibration compensation system, the invention may also include a spring between the countermass and the housing. The motor, spring, and countermass can be tuned to the dominant vibration frequency of the machine.

The vibration compensation system according to the invention is advantageous because the system error signal is a measure of the net relative motion between the machine's moving parts, the countermass, and the machine housing. Since the gross motion of the machine is not detected, the system is unaffected by the choice of machine mount. Thus, a stiff mount can be employed, which makes the mechanical impedance of the machine behave as a pure mass.

Furthermore, since an error signal is generated and fed back to the motor which powers the countermass, the compensator has many of the advantages of closed-loop control. The feedback can compensate for nonlinearities of the motor, spring, and bearings. It can also compensate for nonsinusoidal disturbances or sinusoidal disturbances of varying frequency. Moreover, it can compensate for changes in the environment or system degradation over time. Tolerances are not as critical as in the pure balancing approach. The vibration compensation system according to the invention is also advantageous because a single countermass of arbitrary size, location, and stroke can compensate for a complex combination of a machine's internal oscillating bodies. This eliminates most formerly restrictive design constraints.

DESCRIPTION OF THE PREFERRED EMBODIMENTS

Figure 1:
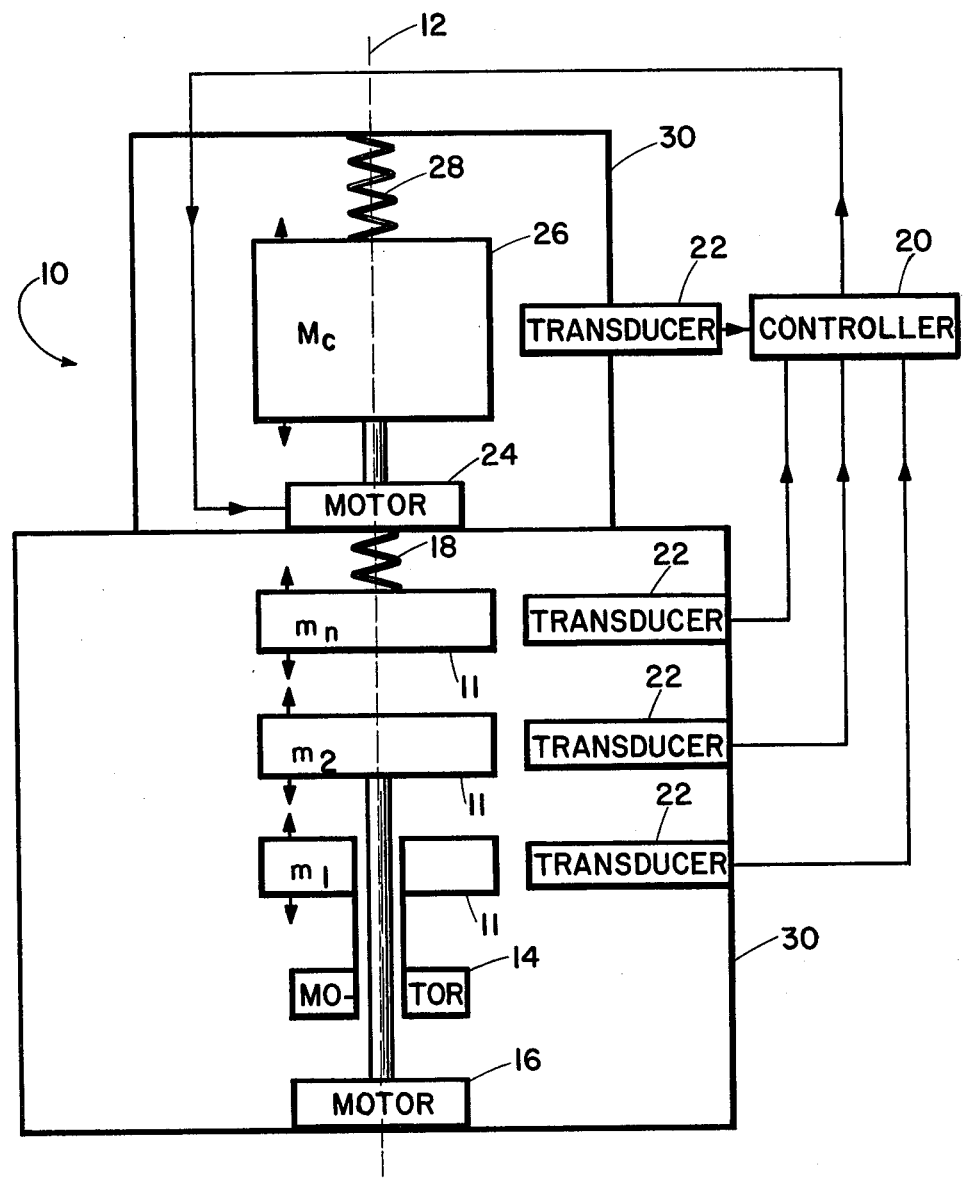
FIG. 1 is a schematic representation of a vibration compensation system according to the invention, attached to a vibrating machine.

FIG. 1 shows a vibration compensation system according to the invention combined with a machine whose vibration is to be attenuated. The machine 10 includes one or more moving bodies 11. In FIG. 1, the moving body 11 with mass $m_1$ is linearly reciprocated along axis 12 of the machine by motor 14. The body with mass $m_2$ is linearly reciprocated along axis 12 by motor 16. Finally, the body with mass $m_n$ is linearly reciprocated along axis 12 by spring 18 (and some source, not shown, for supplying the small amount of energy lost over time).

While only three moving bodies are shown in FIG. 1, according to the invention there may be any number of such bodies in machine 10. Moreover, in general each body may move along any path (curved or straight, and in one, two or three dimensions), and the path of each moving body may be different.

In practice, machine 10 may be, for example, a Stirling-cycle cryogenic cooler. The moving bodies in such a machine include pistons and displacers which move reciprocally parallel to one or more axes. In some cases, the pistons may be driven by linear voice coil motors of the moving-magnet type. In some cases the displacers may be driven indirectly by the flow of working gas through the cylinders.

In Stirling-cycle coolers and other machines in which vibration is caused by internal moving bodies, it is often desirable to make part of the machine vibration free. Since it is usually the machine housing which is desired to be vibration free, it will be convenient to use this as the reference point with respect to which vibration is to be minimized. Thus, any reference to housing herein is meant to also include other points of reference which may be chosen.

The vibration compensation system shown in FIG. 1 includes a controller 20 having inputs supplied by signals from transducers 22 and having an output powering the motor 24. Motor 24 drives countermass 26 in a direction parallel to axis 12. Spring 28 may (optionally) be provided between the countermass 26 and the housing 30 in order to keep the countermass 26 centered on the average about its mid-stroke position. In addition, the spring 28 and countermass 26 can be tuned to the dominant vibration frequency, if one exists, in order to conserve energy. This is useful if the disturbance to be compensated is known to include a dominant vibration at a constant frequency. The effect would be to substantially lower the motor power requirements.

Transducers 22 may be, for example, position, velocity, or acceleration sensors, or combination of such sensors. Linear Variable Differential Transformer (LVDT) position transducers are preferred because they are of relatively simple and inexpensive construction and their outpue position, or any time derivative or time integral thereof, of the bodies 11 moving within the machine relative to that part of the machine which is to be vibration-free (the housing). This broad range of choices follows from the analysis, below.

First, the momentum, p, of all moving bodies in the machine/compensation system combination is given by the equation $$p = M\frac{d}{dt}Z + M_c\frac{d}{dt}(Z + X_c) + \Sigma m_i\frac{d}{dt}(Z + X_i) \quad (1)$$

(In the above and following equations, the various symbols used are defined in Table 1, below.) Since the force exerted by a moving body is equal to its rate of change of momentum with time (the first time derivative of the momentum), equation (1) can be modified to yield $$F = (M + M_c + \Sigma m_i)\frac{d^2Z}{dt^2} + \Sigma m_i\frac{d^2X_i}{dt^2} + M_c\frac{d^2X_c}{dt^2} \quad (2)$$

Now, if one sets $$M_c\frac{d^2X_c}{dt^2} = -\Sigma m_i\frac{d^2X_i}{dt^2} \quad (3)$$

then the last two terms of equation (2) cancel out, and the machine/compensation system combination acts on the environment exactly like a solid mass of magnitude $$\text{Mass} = M + M_c + \Sigma m_i \quad (4)$$

Thus, all of the nonconstant mechanical impedance and shaking force is eliminated.

According to the invention, vibration compensation is complete to the extent that equation (3) holds true. While it is possible to directly measure the acceleration of each moving body 11 and of the countermass 26, it is more desireable to measure the position of each. This is due to the fact that good position sensors are available, many machines already incorporate position sensors for other purposes, and since the countermass is confined in a limited space, it is important to know its actual position. Accordingly, instead of using equation (3) as the criterion for vibration compensation, it is preferable to set $$M_cX_c = -\Sigma m_iX_i \quad (5)$$

Now, whenever equation (5) is satisfied, so is equation (3), and therefore vibration is eliminated.

In order to control motor 24 so that the motion of countermass 26 satisfies equation (5), one can generate an electronic signal which will, for example, have a value of zero whenever equation (5) is satisfied. If each transducer 22 has an output which is a linear function of its input, for example some volts per meter, which is preferred, then the electronic signal would be $$V_e = -\Sigma\frac{V_im_i}{T_i} - \frac{V_cM_c}{T_c} \quad (6)$$

TABLE I

| | |
|---|---|
| $m_i$ | is the mass of the I'th moving body |

TABLE I-continued

| | |
|---|---|
| $M_c$ | is the mass of the countermass |
| M | is the mass of all parts of the machine/vibration compensation system which do not move relative to the housing |
| $X_i$ | is the displacement of the I'th moving body relative to its average location with respect to the machine housing |
| $X_c$ | is the displacement of the countermass relative to its average location with respect to the machine housing |
| Z | is the displacement of the entire machine relative to an inertial frame of reference |
| $T_i$ | is the transducer constant for the I'th moving body (e.g. volts per meter) |
| $T_c$ | is the transducer constant for the countermass (e.g. volts per meter) |
| F | is the net force between the machine and its environment |
| $V_i$ | is the output voltage signal from the I'th position transducer |
| $V_c$ | is the output voltage signal from the countermass position transducer |

Figure 2:
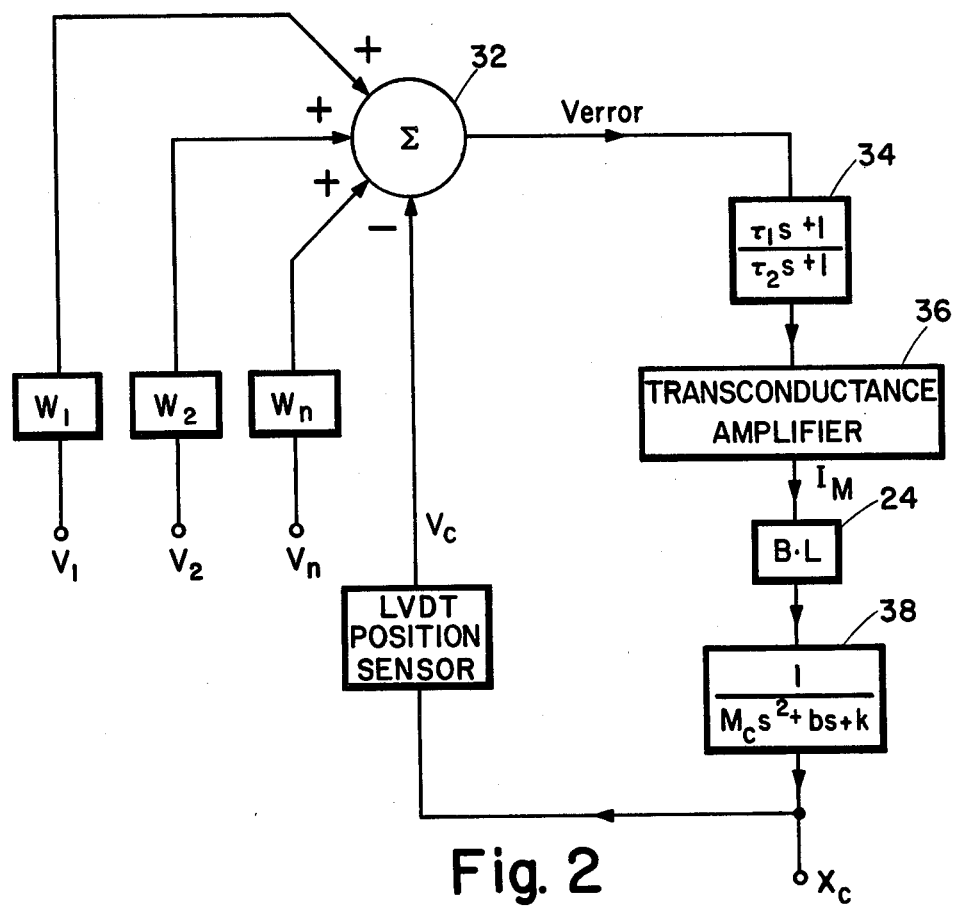
FIG. 2 is a schematic representation of the control system for a vibration compensation system according to the invention.

The vibration compensation theory described above can be practically applied in the control system shown in FIG. 2. In FIG. 2, the output, $V_i$, of each position transducer except the countermass position transducer is first amplified by a weighting factor $W_i$ before going to a summing amplifier 32. The output, $V_c$, of the coutnermass position transducer is directly applied to the summing amplifier 32. Each weighting factor $W_i$ is given by the equation $$W_i = -\frac{T_c}{T_i}\cdot\frac{m_i}{M_c} \quad (7)$$

which is obtained by simply rearranging equation (6). Of course, other suitable weighting schemes may also be used according to the invention. Preferably, operational amplifiers or other low power, linear amplifiers will be used to implement the weighting of the transducer outputs.

Thus, the output of summing amplifier 32 is an error signal $$V_{error} = \Sigma W_iV_i - V_c \quad (8)$$

By forcing this error signal to zero, one also forces equation (3) to become satisfied.

Alternatively, one could measure the acceleration of each moving body and the countermass directly and therefore compute the quantities in the equation (3) directly. By the same token, any other time derivative or time integral of the positions of the moving bodies and the countermass can be used which can be directly or indirectly related to the accelerations. It is also possible to mix the transducers 22, for example position transducers, velocity transducers, and acceleration transducers can each be used in a given device. In this case, the transducer outputs could be electronically differentiated or integrated with respect to time in order to produce compatible signals for the summing amplifier 32.

Summing amplifier 32 may be any suitable amplifier, for example an operational amplifier. The output of summing amplifier 32 should be very linear over the desired bandwidth (several times the fundamental vibrational frequency).

Once the error signal is obtained, it is then preferrably processed by lead compensator 34 or some other device which functions to stabilize the control system in its operating range. The output of lead compensator 34 is amplified by transconductance amplifier 36 whose output is used to drive the motor 24. Amplifier 36 is preferably a high efficiency power amplifier, such as a pulse width modulated amplifier.

The motor force constant is represented by B·L, B being the magnetic field and L being the length of the motor coil. Finally, the motor 24 drives the countermass 26 so as to vary the position of the countermass with em described with reference to FIG. 2 will drive the error signal to zero. If, for example, the weighted average position of the moving bodies is negative, the reference signal ($\Sigma W_i V_i$) will be positive. If the position of the countermass is positive, $V_c$ will also be positive. Now, if the magnitude of the weighted average position of the moving bodies exceeds the magnitude of the position of the countermass, then the magnitude of the reference signal will exceed the value of $V_c$. Consequently the error signal of equation (8) will be positive, and the countermass wil be moved in the positive direction until $V_{error}$ is zero. Changes in the weighted average position of the moving bodies are tracked by changes induced in the position of the countermass, so that $V_{error}$ always approaches zero and vibration is minimized.

Figure 3:
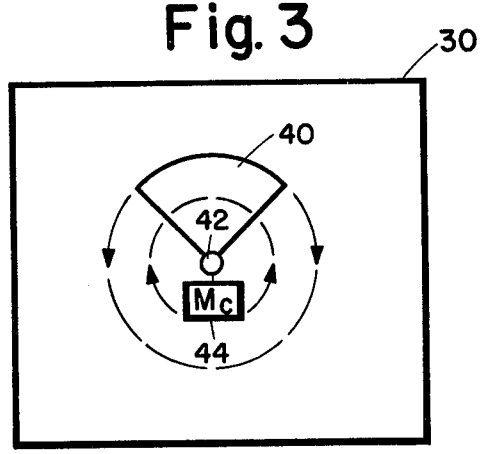
FIG. 3 of a schematic representation of a machine having a body which moves in a reciprocating pivoting motion and having a countermass capable of being linearly reciprocated in a parallel direction, for use in a vibration compensation system according to the invention.

FIG. 3 shows another embodiment of the present invention. For simplicity, this embodiment is shown having a single moving body 40 which is reciprocally pivoting around axis 42. In order to counter the vibrational torque generated by the motion of moving body 40, a countermass 44 is driven in a pivoting motion around axis 42 in a direction opposite the motion moving body 40.

In general, where the motion of moving body 40 is not uniform and/or there are many bodies pivoting around axis 42, the motion of countermass 44 is controlled by using a system such as that shown in FIG. 2. Instead of axial position transducers, however, the transducers would sense the angular position of each moving body and of the countermass.

I claim:

1. A vibration compensation system for actively attenuating the vibration of a machine, said machine having a housing, a linear dimension, and at least one body moving within the housing with a velocity component parallel to the linear dimension, said compensation system comprising:
    a countermass capable of being linearly reciprocated relative to the housing in a direction parallel to the linear dimension;
    a motor, coupled to the housing, for driving the countermass in a direction parallel to the linear dimension;
    means for sensing the position, or any time derivative or time integral thereof, along the linear dimension relative to the housing of the moving body, said means producing a signal output;
    means for sensing the position, or any time derivative or time integral thereof, along the linear dimension relative to the housing of the countermass, said means producing a signal output; and
    control means for supplying power to the motor in response to the signal outputs from all of the sensing means in a way that causes the acceleration along the linear dimension relative to the housing of the countermass to be in a direction opposite the acceleration along the linear dimension relative to the housing of the moving body, the magnitude of the acceleration along the linear dimension relative to the housing of the countermass being controlled to be equal to the product of the acceleration along the linear dimension relative to the housing of the moving body multiplied by its mass divided by the mass of the countermass.

2. A vibration compensation system for actively attenuating the vibration of a machine, said machine having a housing, an axis, and at least one body moving within the housing with a velocity component parallel to the axis, saide axis;
    means for sensing the axial position, or any time derivative or time integral thereof, relative to the housing of the moving body, said means producing a signal output;
    means for sensing the axial position, or any time derivative or time integral thereof, relative to the housing of the countermass, said means producing a signal output; and
    control means for supplying power to the motor in response to the signal outputs from all of the sensing means in a way that causes the axial acceleration relative to the housing of the countermass to be in a direction opposite the axial acceleration relative to the housing of the moving body, the magnitude of the axial acceleration relative to the housing of the countermass being controlled to be equal to the product of the axial acceleration relative to the housing of the moving body multiplied by its mass divided by the mass of the countermass.

3. A vibration compensation system as claimed in claim 2, characterized in that:
    the machine has more than one body, each body moving within the housing with a velocity component parallel to the axis;
    the compensation system comprises separate means for sensing the axial position, or any time derivative or time integral thereof, relative to the housing of each moving body, each sensing means producing a separate output signal whose magnitude is a function of the motion of the moving body with which it is associated; and
    the control means supplies power to the motor in a way that causes the axial acceleration relative to the housing of the countermass to be in a direction opposite the net axial acceleration relative to the housing of the moving bodies, the magnitude of the axial acceleration relative to the housing of the countermass being controlled to be equal to the vector sum of the products of the axial acceleration relative to the housing of each moving body multiplied by its mass divided by the mass of the countermass.

4. A vibration compensation system as claimed in claim 3, characterized in that the sensing means each comprise an acceleration transducer producing a signal output whose magnitude is a function of acceleration.

5. A vibration compensation system as claimed in claim 3, characterized in that the sensing means each comprise a velocity transducer producing a signal output whose magnitude is a function of velocity.

6. A vibration compensation system as claimed in claim 3, characterized in that the sensing means each comprise a position transducer producing a signal output whose magnitude is a function of position.

7. A vibration compensation system as claimed in claim 4, 5 or 6, characterized in that the control means comprises:

amplifier means for separately amplifying the signal output of each sensing means, said amplifier means generating separate amplified signal outputs associated with each moving body and the countermass;

means for adding the amplified signal outputs, said adding means generating an error signal; and feedback amplifier means for amplifying the error signal and producing a signal for powering the motor.

8. A vibration compensation system as claimed in claim 7, characterized in that the vibration compensation system further comprises spring means for generating a force between the countermass and the housing, said force varying substantially as a linear function of the axial distance between the countermass and an equilibrium position of the countermass.

9. A vibration compensation system as claimed in claim 8, characterized in that the motor is rigidly fastened to the housing.

* * * * *